United States Patent
Durán Jiménez et al.

(10) Patent No.: US 9,583,962 B1
(45) Date of Patent: Feb. 28, 2017

(54) MOBILE DEVICE BATTERY LIFE PROTECTION

(71) Applicant: International Business Machines Corporation, Armonk, NY (US)

(72) Inventors: Oscar Durán Jiménez, Zapopan (MX); José Eduardo Martínez Cordero, Ciudad Nezahualcoyotl (MX); Maharaj Mukherjee, Poughkeepsie, NY (US); Gabriel A. Vallarta, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/874,500

(22) Filed: Oct. 5, 2015

(51) Int. Cl.
*H04M 1/00* (2006.01)
*H02J 7/00* (2006.01)
*H04B 1/3883* (2015.01)

(52) U.S. Cl.
CPC ............ *H02J 7/007* (2013.01); *H02J 7/0029* (2013.01); *H04B 1/3883* (2013.01); *H02J 2007/0037* (2013.01)

(58) Field of Classification Search
CPC . H04W 88/00; H04W 88/025; H04M 1/0256; H04B 1/16; H04B 7/00; H04B 1/3883; H02J 7/007; H02J 7/0022; H02J 7/045; H02J 7/0029; H02J 7/035; B60L 11/1811; B60L 11/1868
See application file for complete search history.

(56) References Cited

U.S. PATENT DOCUMENTS

| | | | |
|---|---|---|---|
| 6,252,375 B1 | 6/2001 | Richter et al. | |
| 7,843,088 B2 | 11/2010 | Perper et al. | |
| 7,910,833 B2 | 3/2011 | McGinley et al. | |
| 8,508,079 B1 | 8/2013 | Corrado | |
| 2006/0174939 A1 | 8/2006 | Matan | |
| 2015/0237191 A1* | 8/2015 | Moran | H04M 1/0256 455/556.1 |
| 2015/0291052 A1* | 10/2015 | Nakazawa | H02J 7/0022 320/101 |
| 2016/0064979 A1* | 3/2016 | Huang | H02J 7/007 320/114 |

OTHER PUBLICATIONS

Huang et al., "Fuzzy-Control-Based Five-Step Li-Ion Battery Charger", PEDS2009, Power Electronics and Drive Systems, pp. 1547-1551.

(Continued)

*Primary Examiner* — Thanh Le
(74) *Attorney, Agent, or Firm* — L. Jeffrey Kelly (57) ABSTRACT

A method for controlling a charging process of a battery-operated device includes connecting the battery-operated device to a charger device to start the charging process, sending a first signal from the battery-operated device to the charger device in response to a charge level of a battery in the battery-operated device being below a first threshold, continuing the charging process until the charge level of the battery is above a second threshold, and sending a second signal from the battery-operated device to the charger device to stop the charging process in response to the charge level of the battery being above the second threshold.

13 Claims, 6 Drawing Sheets

(56) References Cited

OTHER PUBLICATIONS

Liu et al., "Adaptive Power Management Based on Reinforcement Learning for Embedded System", IEA/AIE 2008, LNAI 5027, pp. 513-522, 2008.
Mell et al., "The NIST Definition of Cloud Computing", National Institute of Standards and Technology, Recommendations of the National Institute of Standards and Technology, Special Publication 800-145, Sep. 2011, 7 pages.
Roberson et al., "After-hours Power Status of Office Equipment and Energy Use of Miscellaneous Plug-Load Equipment", May 2004, Lawrence Berkeley National Laboratory, Berkeley Lab, 40 pages.
Yilmaz et al., "Review of Battery Charger Topologies, Charging Power Levels, and Infrastructure for Plug-In Electric and Hybrid Vehicles", IEEE Transactions on Power Electronics, vol. 28, No. 5, May 2013, pp. 2151-2169.

\* cited by examiner

FIG. 6

MOBILE DEVICE BATTERY LIFE PROTECTION

BACKGROUND

The present invention generally relates to battery-operated devices, and more particularly, to a power delivery unit capable of turning on/off a charging process of a mobile device based on a signal sent from the mobile device to the power delivery unit.

Battery life is a significant design constraint in current battery-operated devices, particularly in mobile devices. Generally, performance of a mobile device may rely on a rate of power consumption, which may translate into available battery life. Managing power usage by hardware components and/or software applications in a system to keep overall power consumption within limits presents a challenging task. Typically, in order to charge the battery, mobile devices are connected to a power delivery unit. The power delivery unit may include a combination of a charger and a power adapter so that alternating current with an input voltage is received and converted to direct current, and the voltage is stepped-down to an output voltage for which the battery is designed.

SUMMARY

According to an embodiment of the present disclosure a method for controlling a charging process of a battery-operated device may include connecting the battery-operated device to a charger device to start the charging process, sending a first signal from the battery-operated device to the charger device in response to a charge level of a battery in the battery-operated device being below a first threshold, continuing the charging process until the charge level of the battery is above a second threshold, and sending a second signal from the battery-operated device to the charger device to stop the charging process in response to the charge level of the battery being above the second threshold.

According to another embodiment of the present disclosure a computer system for controlling a charging process of a battery-operated device may include one or more processors, one or more computer-readable memories, one or more computer-readable tangible storage devices, and program instructions stored on at least one of the one or more storage devices for execution by at least one of the one or more processors via at least one of the one or more memories, the computer system is capable of performing a method that may include connecting the battery-operated device to a charger device to start the charging process, sending a first signal from the battery-operated device to the charger device in response to a charge level of a battery in the battery-operated device being below a first threshold, continuing the charging process until the charge level of the battery is above a second threshold, and sending a second signal from the battery-operated device to the charger device to stop the charging process in response to the charge level of the battery being above the second threshold.

According to another embodiment of the present disclosure, a computer program product for controlling a charging process of a battery-operated device may include a computer readable non-transitory article of manufacture tangibly embodying computer readable instructions which, when executed, cause a computer to carry out a method that may include connecting the battery-operated device to a charger device to start the charging process, sending a first signal from the battery-operated device to the charger device in response to a charge level of a battery in the battery-operated device being below a first threshold, continuing the charging process until the charge level of the battery is above a second threshold, and sending a second signal from the battery-operated device to the charger device to stop the charging process in response to the charge level of the battery being above the second threshold.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Several factors may affect the lifespan of a mobile device battery. Some examples typically include: keeping the mobile device connected to a charger when the battery is already fully charged, or making/receiving phone calls (when the device is a cellular phone or tablet) while the battery is being charged. These are common scenarios, particularly at night, when users plug their mobile devices in order to have them fully charged in the morning. Most users are not aware of the technical considerations and/or manufacturer's recommendations to extend the life of mobile device batteries.

By implementing a mechanism in a power delivery unit to automatically detect a charge level of a battery or when a phone call is being established (either incoming or outgoing)

embodiments of the present disclosure may, among other potential benefits, turn off an in-progress charging process such that even when the mobile device is plugged to an electrical outlet no effective charging takes place. Additionally, unless the phone call is terminated and the battery's charge is lower than 100% or the battery's charge drops to a level that requires to be recharged, the charging process is not resumed.

Embodiments of the present invention generally relate to battery-operated devices, and more particularly, to a power delivery unit capable of automatically turning on/off a charging process of a battery-operated device (e.g., mobile device) based on a signal sent from the battery-operated device to the power delivery unit. One way to turn on/off the charging process of the battery-operated device may include implementing a logic circuitry in the power delivery unit (charger device) such that a signal with a current charging status is sent from the battery-operated device or its battery to the charger device to which the battery-operated device is connected. One embodiment by which to turn on/off the charging process in battery-operated devices in order to extend battery life is described in detail below by referring to the accompanying drawings in FIGS. 1-3.

Figure 1:
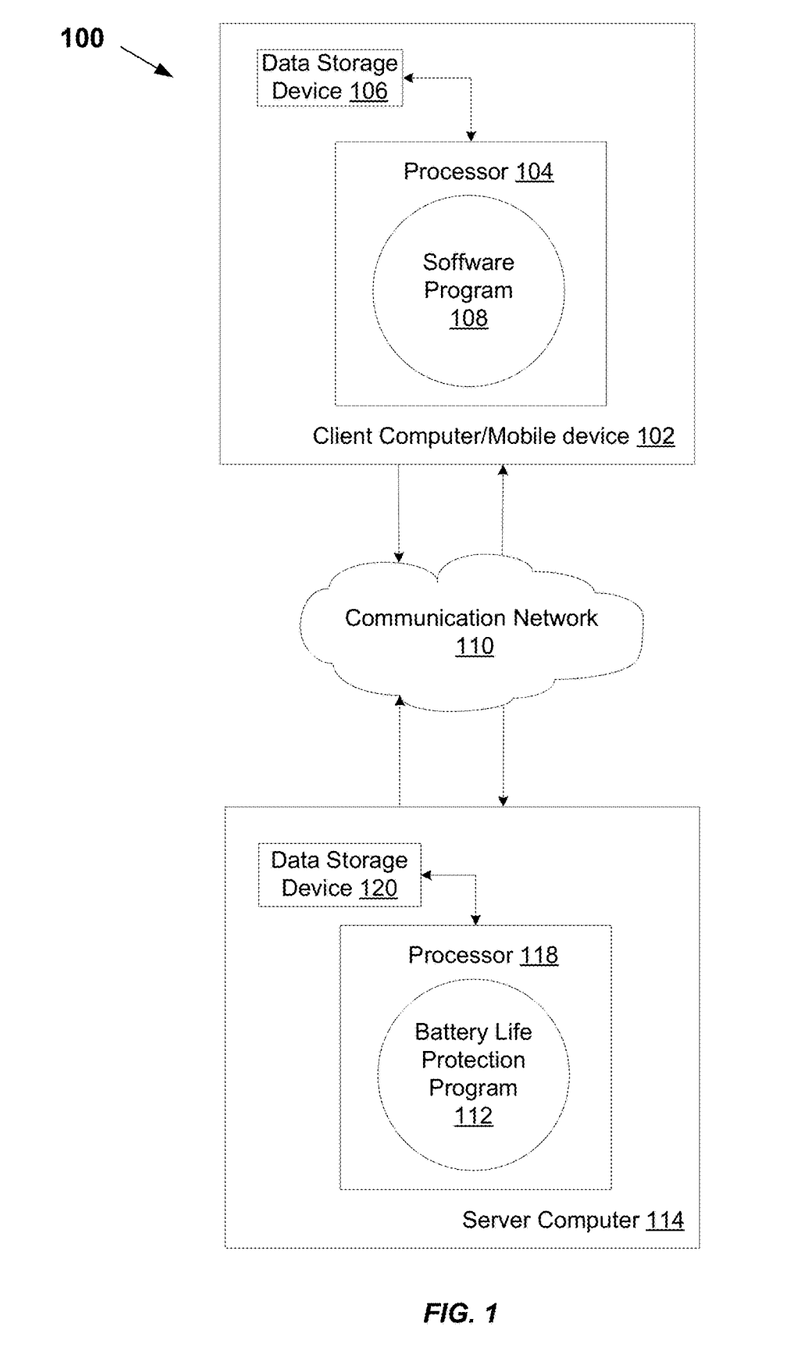
FIG. 1 is a block diagram illustrating a networked computer environment, according to an embodiment of the present disclosure.

Referring now to FIG. 1, an exemplary networked computer environment 100 is depicted, according to an embodiment of the present disclosure. The networked computer environment 100 may include a client computer/mobile device 102 with a processor 104 and a data storage device 106 that is enabled to run a software program 108. The networked computer environment 100 may also include a server computer 114 and a communication network 110. The networked computer environment 100 may include a plurality of client computers/mobile devices 102 and server computers 114, only one of which is shown. The communication network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer/mobile device 102 may communicate with a battery life protection program 112 running on server computer 114 via the communications network 110. The communication network 110 may include connections, such as wire, wireless communication links, or fiber optic cables. As will be discussed with reference to FIG. 4, server computer 114 may include internal components 402a and external components 404a, respectively, and client computer 102 may include internal components 402b and external components 404b, respectively. Client computer/mobile device 102 may be, for example, a mobile device, a telephone (including smartphones), a personal digital assistant, a netbook, a laptop computer, a tablet computer, a desktop computer, or any type of computing devices capable of accessing a network.

Figure 2:
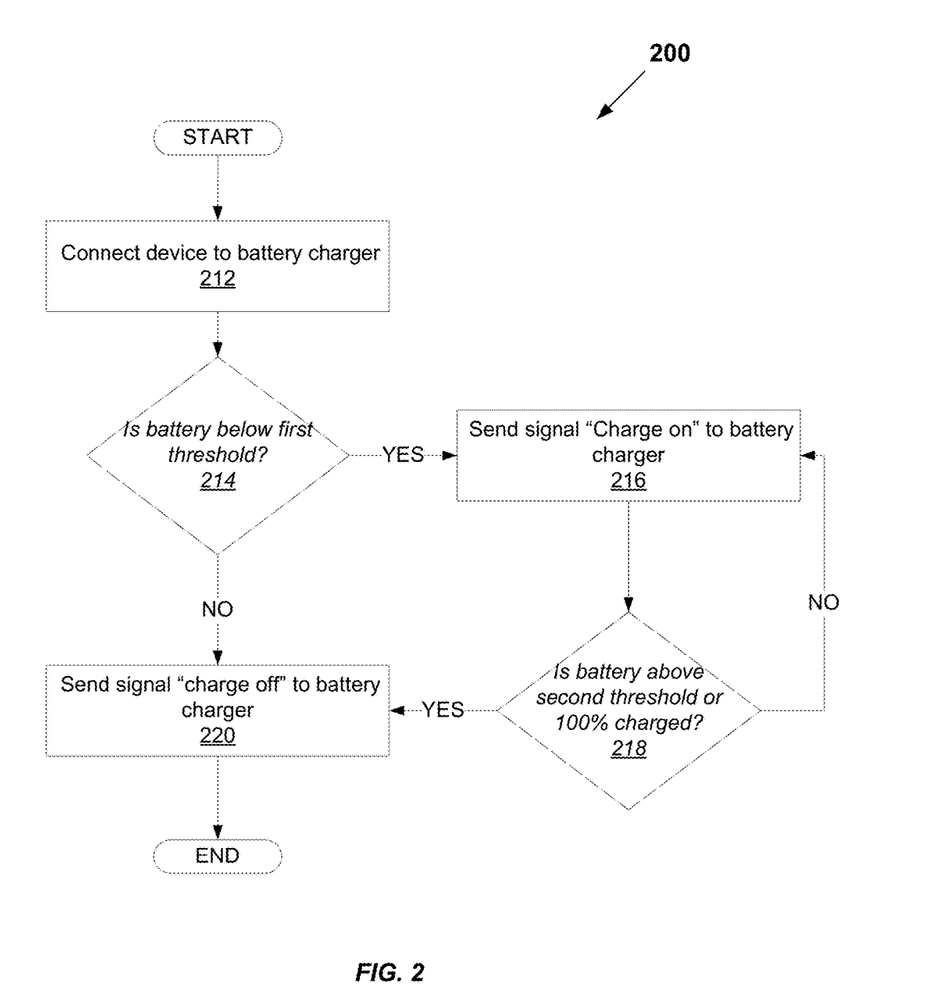
FIG. 2 is a flowchart depicting the steps of a method for controlling a charging process in mobile devices, according to an embodiment of the present disclosure.

Referring now to FIG. 2, a flowchart 200 illustrating the steps of a method to control a charging process in a mobile device is shown, according to an embodiment of the present disclosure. The process starts at step 212 by connecting a mobile device, such as the client computer/mobile device 102 shown in FIG. 1, to a power delivery unit (hereinafter "charger device"). It may be understood that the mobile device (e.g., client computer/mobile device 102) includes or is connected to a battery (not shown).

At step 214, if the current charge level of the battery is approximately equal to or lower than a first threshold, a signal is sent at step 216 from the mobile device to the charger device indicating that the battery needs to be charged ("charge on" signal sent from mobile device to charger device). Stated differently, a first signal is sent from the mobile device to the charger device in response to a charge level of the battery in the mobile device being equal to or below a first threshold. It should be noted that the first threshold may include a custom setting based on user preferences and/or battery's chemical composition. In one embodiment, the first threshold may be a charge clip level of the battery. In another embodiment, the first threshold may range from approximately 20% of charge remaining (custom setting based on user preferences and/or battery's chemical composition) to approximately 100% (custom setting based on user preferences).

It should also be noted that the charger device may include a logic circuitry (not shown) which may allow the charger device to communicate with the mobile device. More specifically, the circuitry may allow the charger device to receive a signal from the mobile device indicating a current status of the charging process. In some embodiments, the signal may be sent from the battery of the mobile device to the charger device.

Then at step 218, when the charge level of the battery is approximately equal to or greater than a second threshold, a signal to stop the charging process is sent from the mobile device to the charger device at step 220. Typically, the second threshold may correspond to a charge level of 100% (battery fully charged). However, in some embodiments, the second threshold may vary from approximately 90% to approximately 100% (custom setting based on user preferences) of charge reached. At this point, the charging process may be stopped and the mobile device may remain connected to the charger device. By stopping the charging process once the battery has reached a maximum charge level (second threshold), erosion of the battery may be prevented extending its useful life.

As may be known by those skilled in the art, a lithium-ion battery works on ion movement between positive and negative electrodes. In theory such mechanism may work indefinitely but cycling, elevated temperatures, and aging may decrease their performance over time. Further, the chemical activity that turns electricity into chemical energy in a battery is not 100% efficient. Approximately 80-90% of the electrical energy may convert into wasted heat whereas only 10-20% of the energy may convert into stored chemical energy. Particularly, smartphones may typically include a plastic body that is often wrapped around by one or more protective plastic covers which are not very effective in dissipating the heat out. As a result, when a battery is charged for a long time it overheats. Overheating may then increase charging time.

In general, most manufacturers take a conservative approach and specify the life of Li-ion batteries in most consumer products between 300 and 500 discharge/charge cycles. A charge cycle is complete when the battery goes from empty or near-empty to full. Every battery may have a limited number of discharge/charge cycles before the end of its useful life. Therefore, by keeping a battery-operated device connected to a charger for a long time after the battery is fully charged, the number of discharge/charge cycles is reduced and hence the useful life of the battery.

Preferably, lithium-ion batteries may be charged until approximately 50% to approximately 80% of charge is reached. This may allow for the charged ions to continue to work and protect the life of the battery. By charging the device in short spurts throughout the day ions may be provided with enough energy to keep moving. Evaluating battery life on counting cycles may not be conclusive because a discharge may vary in depth and there are no clearly defined standards of what constitutes a cycle. In lieu of cycle count, some device manufacturers suggest battery replacement on a date-stamp, but this method is not reliable either because it ignores environmental conditions. A battery may fail within the allotted time due to heavy use or unfavorable temperature conditions, but most quality packs last considerably longer than what the stamp indicates.

If the battery is not completely charged at step 218, the process returns to step 216 where a signal is sent from the mobile device to the charger device specifying that the battery charge level is below the second threshold and that the charging process needs to continue.

Returning to step 214, when the current charge level of the mobile device battery is greater than the first threshold, a signal is sent at step 220 from the mobile device to the charger device to turn off the charging process ("charge off" signal sent from mobile device to charger device). In this instance, the charging process is put on hold until the charge level of the mobile device battery is equal to or lower than the first threshold, as described above.

In some embodiments, the first and second thresholds may be defined by the mobile device manufacturer in an initial setting which may be subsequently modified by the user based on their particular needs. For example, the initial setting may be: "Turn off charging process when battery reaches 100% charge", or "Turn on charging process when battery reaches 15% charge". For example, a user may change "Power on Clip Level or lower" to "Start charging process when battery reaches 40% charge". In the latter example, the charger device may start the charging process when the battery is under use and reaches 40% charge instead of 15%, this may prevent having the charger device working and using energy while connected to a power outlet, protecting both, the environment and the life of the mobile device battery.

Figure 3:
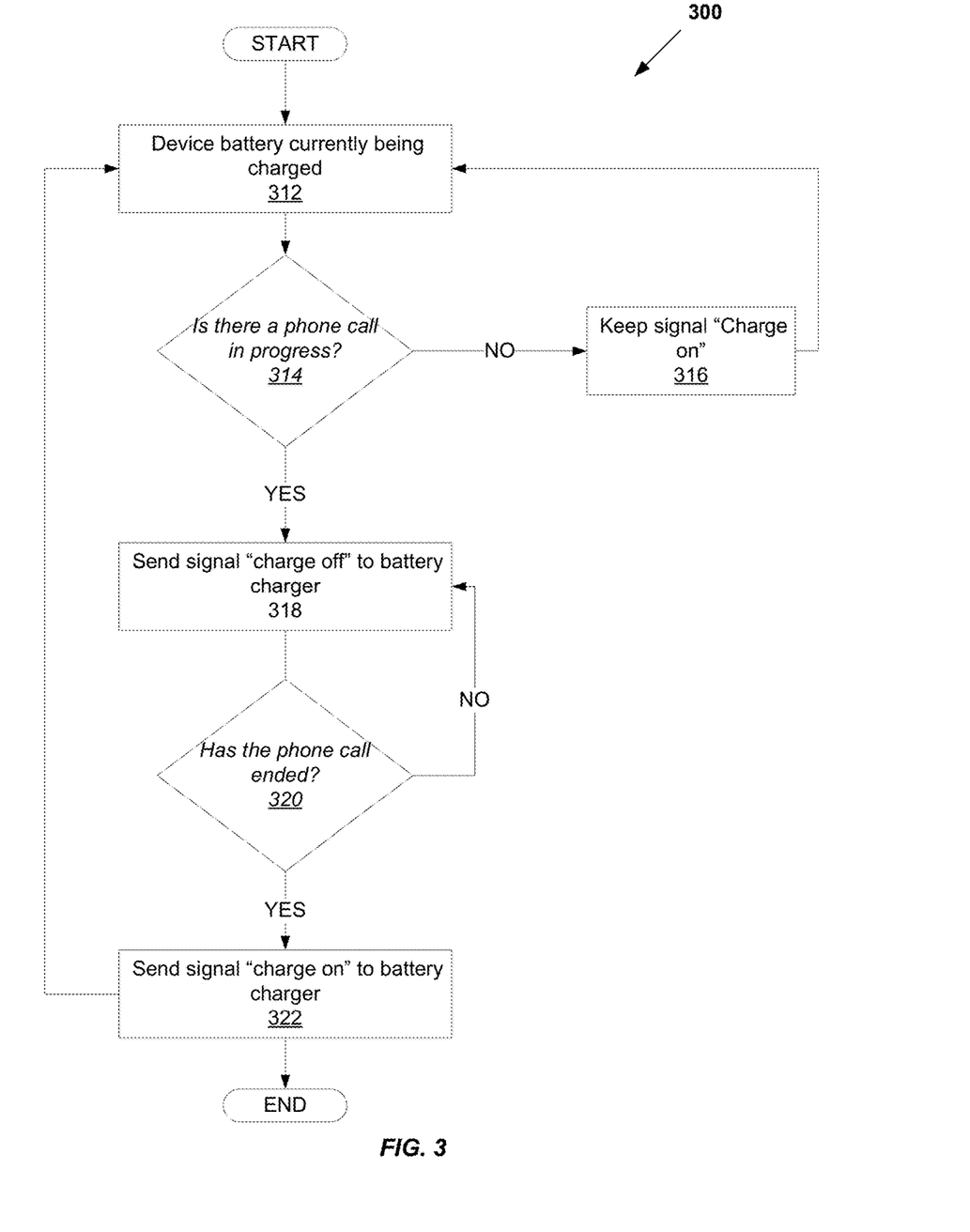
FIG. 3 is a flowchart depicting the steps of a method for controlling a charging process in mobile devices during incoming/outgoing calls, according to an embodiment of the present disclosure.

Referring now to FIG. 3, a flowchart 300 illustrating the steps of a method to control a charging process in a mobile device during incoming/outgoing calls is shown, according to an embodiment of the present disclosure. It should be noted that, in the present embodiment, the mobile device (e.g., client computer/mobile device 102 in FIG. 1) may include any device capable of performing/receiving a phone call. For example, the mobile device may be a cell phone or tablet device.

At step 312, the mobile device is connected to the charger device and the charging process is currently taking place. If at step 314 a phone call is received and answered by the user (phone call in progress), a signal is sent at step 318 to the charger device to put the charging process on hold ("charge off" signal sent from mobile device to charger device). Next, at step 320, when the phone call is finished, a signal is sent from the mobile device to the charger device to resume the charging process ("charge on" signal sent from mobile device to charger device) at step 322. If, at step 318, the phone call is still ongoing, the process returns to step 318 where a signal is sent to the charger device to keep the charging process on hold ("charge off" signal sent from mobile device to charger device).

As may be known by those skilled in the art, when a phone call takes place two inverse chemical reactions may generally occur in the mobile device executing and/or receiving the call, as described below:

Overall reaction on a Li-ion cell: $C+LiCoO_2 \leftrightarrows LiC_6 + Li_{0.5}CoO_2$ At the cathode: $LiCoO_2-Li^+-e^- \leftrightarrows Li_{0.5}CoO_2 \Rightarrow 143$ mAh/g At the anode: $6C+Li^++e^- \leftrightarrows LiC_6 \Rightarrow 372$ mAh/g Both of these reactions are exothermic in nature which may generate additional heat causing the battery to overheat. As previously described with reference to FIG. 2, when a battery is charged for a long time it overheats which increases charging time and reduced the useful life of the battery.

It should be noted that if during a phone call the charge of the mobile device battery fells below a critical level at which the mobile device may run out of power, the mobile device may send a signal to the charger device to resume the charging process such that the phone call currently in-progress is not interrupted.

Therefore, by including a logic circuitry in a power delivery unit or charger device, power on/off functions may be triggered based on a current charge level or phone calls execution in the mobile device, this may in turn prevent battery erosion and extend its useful life. Additionally, in embodiments in which the charger device is connected to an electric outlet but there is not a mobile device being charged, the logic circuitry may allow the charger device to be powered off automatically. This feature may, in addition to protect the battery life, prevent electricity to be drawn by the plugged charger device (also known as "phantom energy" or "vampire power"). The proposed method may be favorable in an office setting in which mobile devices, such as laptops, are usually connected to a power source. In such an instance the charger device may trigger its turn on/off functionality in order to avoid the battery to be charged when it is not needed, also preventing energy waste.

Figure 4:
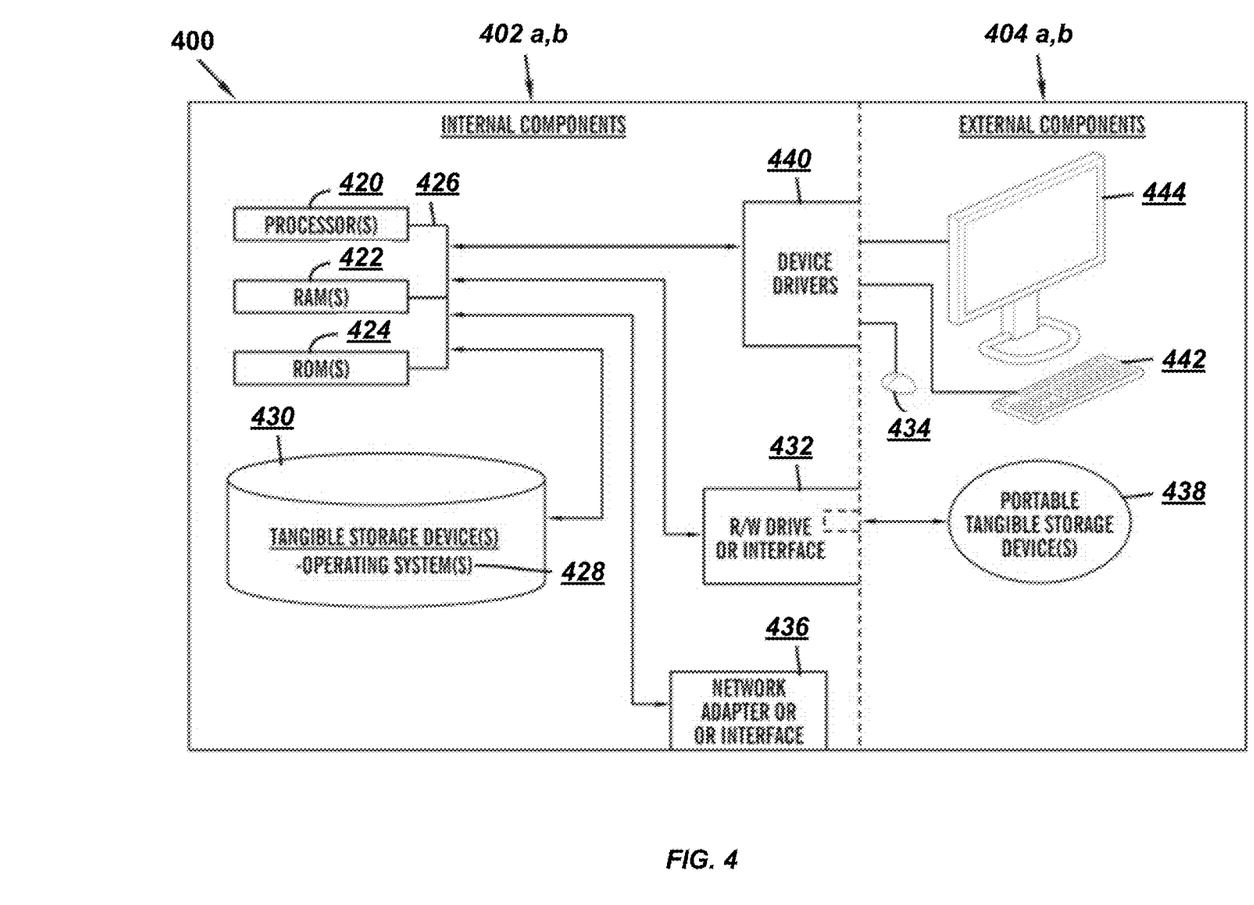
FIG. 4 is a block diagram of internal and external components of computers and servers depicted in FIG. 1, according to an embodiment of the present disclosure.

Referring now to FIG. 4, a block diagram 400 of internal and external components of computers depicted in FIG. 1 is shown according to an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402, 404 is representative of any electronic device capable of executing machine-readable program instructions. Data processing system 402, 404 may be representative of a smart phone, a computer system, PDA, or other electronic devices. Examples of computing systems, environments, and/or configurations that may be represented by data processing system 402, 404 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computer/mobile device 102 (FIG. 1) and server computer 114 (FIG. 1) may include respective sets of internal components 402 a, b and external components 404 a, b illustrated in FIG. 4. Each of the sets of internal components 402 include one or more processors 420, one or more computer-readable RAMs 422 and one or more computer-readable ROMs 424 on one or more buses 426, and one or more operating systems 428 and one or more computer-readable tangible storage devices 430. The software program 108 in client computer 102 (FIG. 1) and the battery life protection program 112 in the server computer 114 (FIG. 1) are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. Software programs, such as the first and second plurality of modules described above can be stored on one or more of the respective portable computer-readable tangible storage devices 438, read via the respective R/W drive or interface 432 and loaded into the respective hard drive 430.

Each set of internal components 402 *a, b* also includes network adapters or interfaces 436 such as a TCP/IP adapter cards, wireless Wi-Fi interface cards, or 3G or 4G wireless interface cards or other wired or wireless communication links. The software program 108 in client computer 102 (FIG. 1) and the battery life protection program 112 in the server computer 114 (FIG. 1) can be downloaded to the client computer 102 (FIG. 1) and server computer 114 (FIG. 1) from an external computer via a network (for example, the Internet, a local area network or other, wide area network) and respective network adapters or interfaces 436. From the network adapters or interfaces 436, the software program 108 in client computer 102 (FIG. 1) and the battery life protection program 112 in the server computer 114 (FIG. 1) are loaded into the respective hard drive 430. The network may comprise copper wires, optical fibers, wireless transmission, routers, firewalls, switches, gateway computers and/or edge servers.

Each of the sets of external components 404 *a, b* can include a computer display monitor 444, a keyboard 442, and a computer mouse 434. External components 404 *a, b* can also include touch screens, virtual keyboards, touch pads, pointing devices, and other human interface devices. Each of the sets of internal components 402 *a, b* also includes device drivers 440 to interface to computer display monitor 444, keyboard 442 and computer mouse 434. The device drivers 440, R/W drive or interface 432 and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
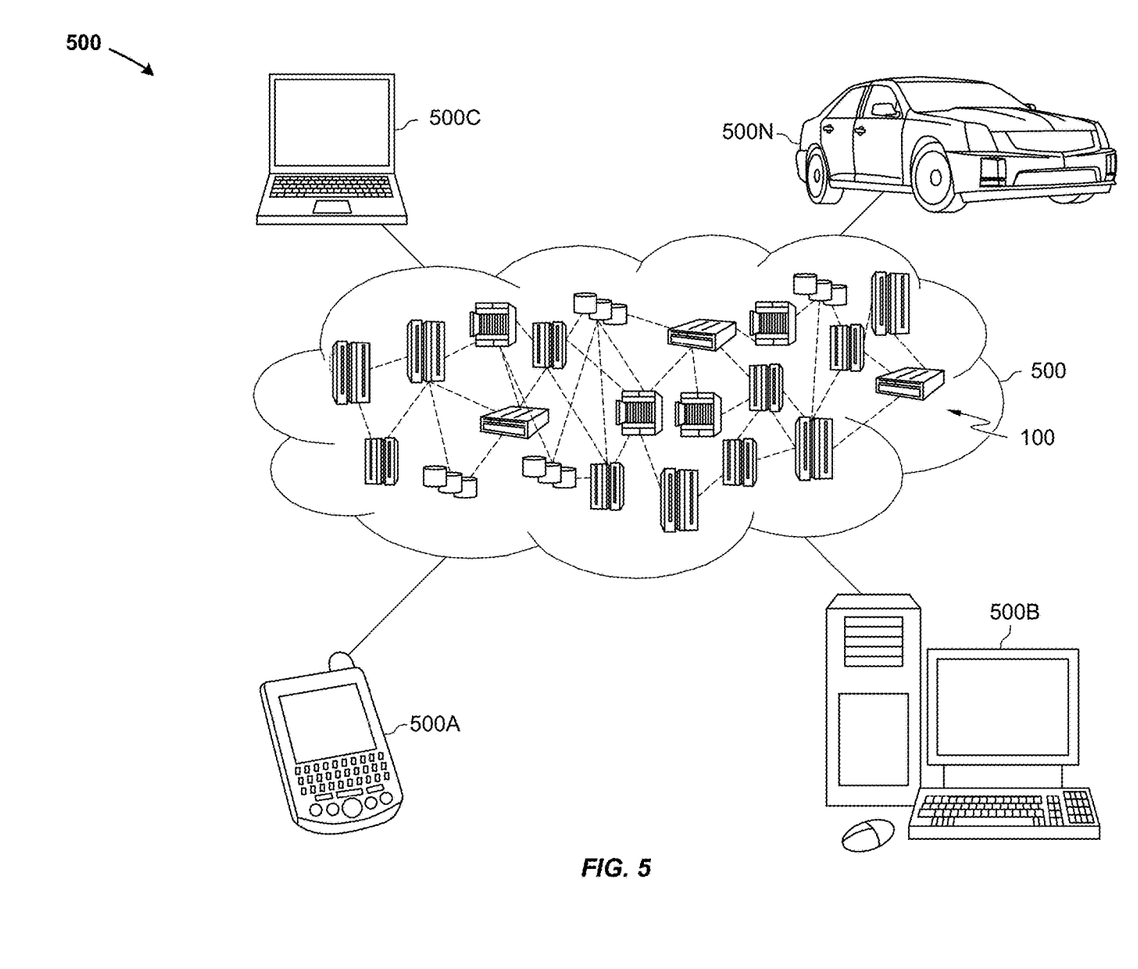
FIG. 5 is a block diagram of an illustrative cloud computing environment including the computer system depicted in FIG. 1, according to an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
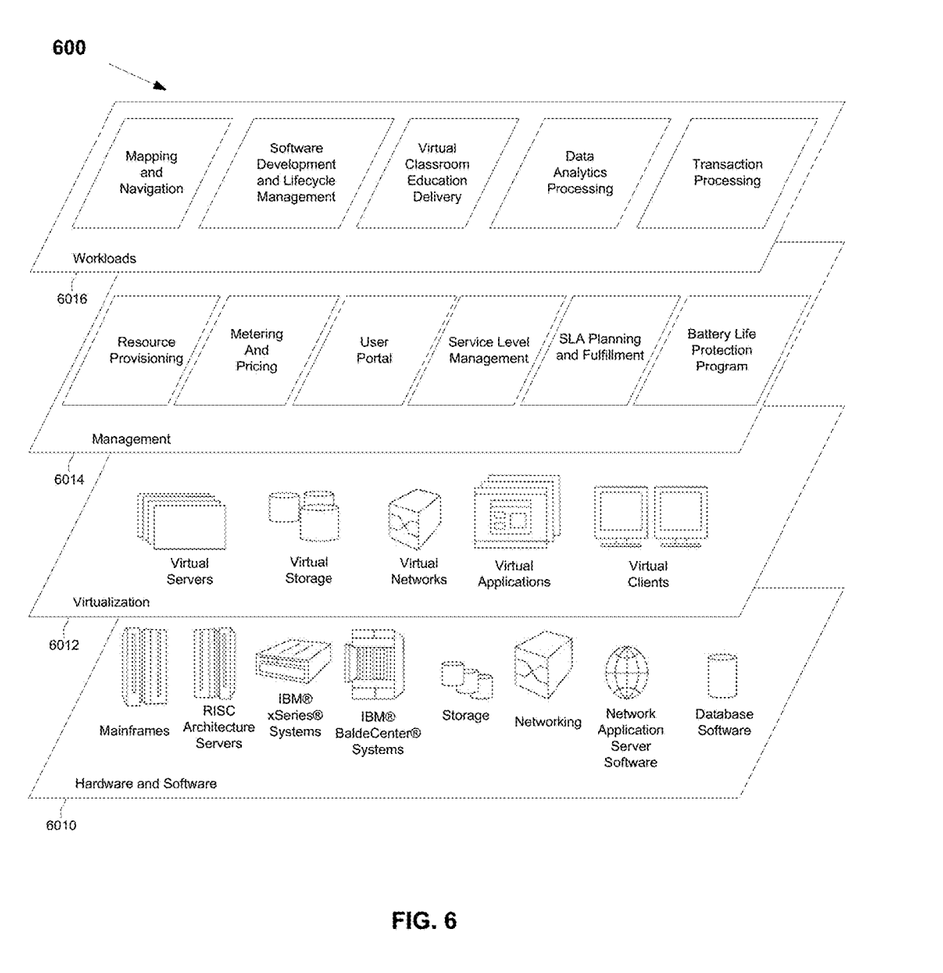
FIG. 6 is a block diagram of functional layers of the illustrative cloud computing environment of FIG. 5, according to an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A program for controlling a charging process in mobile devices in order to protect and extend battery life.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for controlling a charging process, the method comprising:
receiving, by a logic circuitry embedded in a charger device, a first signal from a battery-operated device connected to the charger device,
wherein the first signal communicates the logic circuitry that a charge level of a battery in the battery-operated device is below a first threshold, the first threshold comprising a minimum value associated with an amount of charge remaining in the battery;
in response to the charge level being below the first threshold, starting the charging process;
continuing the charging process until the charge level of the battery is above a second threshold, wherein the second threshold comprises a maximum value associated with an amount of charge reached in the battery,
wherein the first threshold and the second threshold are set according to a manufacturer configuration, a user preference, and a chemical composition of the battery;
receiving, by the logic circuitry, a second signal from the battery-operated device,
wherein the second signal communicates the logic circuitry that the charge level of the battery is above the second threshold;
in response to the charge level being above the second threshold, stopping the charging process;
detecting, by the logic circuitry, when the battery-operated device is disconnected from the charger device, wherein the charger device remains connected to an electric outlet; and
in response to detecting that the battery-operated device is disconnected from the charger device, turning off the charger device to prevent additional electric current to be drawn by the charger device.

2. The method of claim 1, wherein the first threshold comprises the charge level of the battery being equal to or lower than a charge clip level.

3. The method of claim 1, wherein the second threshold comprises the charge level of the battery being approximately 100%.

4. The method of claim 1, further comprising:
receiving, by the logic circuitry, a third signal from the battery-operated device, wherein the third signal communicates the charger device to stop the charging process until a phone call is finished in the battery-operated device.

5. The method of claim 1, further comprising:
receiving, by the logic circuitry, a fourth signal from the battery-operated device, wherein the fourth signal indicates the charger device to resume the charging process in response to the charge level of the battery falling below the first threshold during a phone call.

6. A computer system for controlling a charging process, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a logic circuitry embedded in a charger device, a first signal from a battery-operated device connected to the charger device,
wherein the first signal communicates the logic circuitry that a charge level of a battery in the battery-operated device is below a first threshold, the first threshold comprising a minimum value associated with an amount of charge remaining in the battery;
in response to the charge level being below the first threshold, starting the charging process;
continuing the charging process until the charge level of the battery is above a second threshold, wherein the second threshold comprises a maximum value associated with an amount of charge reached in the battery,
wherein the first threshold and the second threshold are set according to a manufacturer configuration, a user preference, and a chemical composition of the battery;
receiving, by the logic circuitry, a second signal from the battery-operated device,
wherein the second signal communicates the logic circuitry that the charge level of the battery is above the second threshold;
in response to the charge level being above the second threshold, stopping the charging process;
detecting, by the logic circuitry, when the battery-operated device is disconnected from the charger device, wherein the charger device remains connected to an electric outlet; and
in response to detecting that the battery-operated device is disconnected from the charger device, turning off the charger device to prevent additional electric current to be drawn by the charger device.

7. The computer system of claim 6, wherein the first threshold comprises the charge level of the battery being equal to or lower than a charge clip level.

8. The computer system of claim 6, wherein the second threshold comprises the charge level of the battery being approximately 100%.

9. The computer system of claim 6, further comprising:
receiving, by the logic circuitry, a third signal from the battery-operated device, wherein the third signal communicates the charger device to stop the charging process until a phone call is finished in the battery-operated device.

10. The computer system of claim 6, further comprising:
receiving, by the logic circuitry, a fourth signal from the battery-operated device, wherein the fourth signal indicates the charger device to resume the charging process in response to the charge level of the battery falling below the first threshold during a phone call.

11. A non-transitory computer readable medium for controlling a charging process, the non-transitory computer readable medium comprising:
a computer readable non-transitory article of manufacture tangibly embodying computer readable instructions which, when executed, cause a computer to carry out a method comprising:
receiving, by a logic circuitry embedded in a charger device, a first signal from a battery-operated device connected to the charger device,
wherein the first signal communicates the logic circuitry that a charge level of a battery in the battery-operated device is below a first threshold, the first threshold comprising a minimum value associated with an amount of charge remaining in the battery;
in response to the charge level being below the first threshold, starting the charging process;
continuing the charging process until the charge level of the battery is above a second threshold, wherein the second threshold comprises a maximum value associated with an amount of charge reached in the battery,
wherein the first threshold and the second threshold are set according to a manufacturer configuration, a user preference, and a chemical composition of the battery;
receiving, by the logic circuitry, a second signal from the battery-operated device,
wherein the second signal communicates the logic circuitry that the charge level of the battery is above the second threshold;
in response to the charge level being above the second threshold, stopping the charging process;
detecting, by the logic circuitry, when the battery-operated device is disconnected from the charger device, wherein the charger device remains connected to an electric outlet; and
in response to detecting that the battery-operated device is disconnected from the charger device, turning off the charger device to prevent additional electric current to be drawn by the charger device.

12. The non-transitory computer readable medium of claim 11, further comprising:
receiving, by the logic circuitry, a third signal from the battery-operated device, wherein the third signal communicates the charger device to stop the charging process until a phone call is finished in the battery-operated device.

13. The non-transitory computer readable medium of claim 11, further comprising:
receiving, by the logic circuitry, a fourth signal from the battery-operated device, wherein the fourth signal indicates the charger device to resume the charging process in response to the charge level of the battery falling below the first threshold during a phone call.

* * * * *